US012683508B2

(12) United States Patent
Permuy

(10) Patent No.: US 12,683,508 B2
(45) Date of Patent: Jul. 14, 2026

(54) POWER SUPPLY SYSTEM FOR A PLURALITY OF ELECTROLYZERS AND ASSOCIATED FACILITY AND METHOD

(71) Applicant: GE ENERGY POWER CONVERSION TECHNOLOGY LIMITED, Warwicksire (GB)

(72) Inventor: Alfred Permuy, Villebon-sur-Yvette (FR)

(73) Assignee: GE Energy Power Conversion Technology Limited, Warwicksire (GB)

( * ) Notice: Subject to any disclaimer, the term of this patent is extended or adjusted under 35 U.S.C. 154(b) by 213 days.

(21) Appl. No.: 18/732,600

(22) Filed: Jun. 3, 2024

(65) Prior Publication Data

US 2025/0023482 A1     Jan. 16, 2025

(30) Foreign Application Priority Data

Jul. 13, 2023     (EP) ..................................... 23306219

(51) Int. Cl.
*H02M 5/42*                (2006.01)

(52) U.S. Cl.
CPC .................................... *H02M 5/42* (2013.01)

(58) Field of Classification Search
CPC .......... H02M 5/40; H02M 5/42; H02M 5/453; H02M 7/7575; H02M 5/458; H02M 5/45; H02M 5/4585; H02M 5/4505; H02M 5/451; H02M 5/452; H02M 5/447; H02M 5/456; H02M 1/12; H02M 1/4266; H02M 2001/123; H02M 7/53; H02M 7/537;

H02M 7/5387; H02M 7/53871; H02M 7/53873; H02M 7/53875; H02M 7/53876; H02M 3/1582; H02M 3/156; H02M 3/157; H02M 3/158; H02M 3/1584; H02M 3/1586;

(Continued)

(56) References Cited

U.S. PATENT DOCUMENTS 8,644,037 B2 * 2/2014 Raju ...................... H02M 5/271
363/37
8,729,844 B2 * 5/2014 Feng ....................... H02P 27/06
318/105

(Continued)

FOREIGN PATENT DOCUMENTS

EP          3985850 A1      4/2022

OTHER PUBLICATIONS

Extended European Search Report for EP Application No. EP23306219.9 dated Dec. 20, 2023, 9 pages.

*Primary Examiner* — Jeffrey A Gblende
(74) *Attorney, Agent, or Firm* — Wood IP LLC; Theodore A. Wood

(57)          ABSTRACT
Provided are a method for and a power supply system for a plurality of electrolyzers that includes main input terminals to be connected to a grid, an AC/AC power converter, a control circuit, a plurality of supply branches, each having a branch transformer that includes a primary circuit connected to input terminals of each supply branch and at least one secondary circuit, and at least one rectifier connected to the secondary circuit of the branch transformer, the rectifier having output terminals connected to a set of output terminals of each supply branch to supply the output terminals of each supply branch with a DC current.

15 Claims, 5 Drawing Sheets

(58) Field of Classification Search
CPC .... H02M 3/285; H02M 3/33561; H02M 7/49;
H02M 1/045; H02M 7/006; H02M 7/06;
H02M 7/068; H02M 7/153; H02M 7/10;
H02M 1/083; H02M 7/103; H02M 7/106;
H02M 7/19; H02M 7/08; H02M 7/17;
H02M 2001/007; H02M 7/493; H02M
7/53806; H02M 7/5381; H02M 7/483;
H02M 7/217; H02M 7/538466; H02M
1/084; H02M 1/0845; H02M 1/007;
H02M 1/0009; H02M 1/0095; H02M
1/08; H02M 1/088; H02M 3/1588; H02M
7/5395; H02M 1/14; H02M 1/0043;
H02M 1/0074; H02M 1/0077; H02M
1/0045; H02M 1/0006; H02H 7/261;
H02H 7/268; H02J 3/36; H02J 3/01;
H02J 3/46; H02J 3/38
See application file for complete search history.

(56) References Cited

U.S. PATENT DOCUMENTS

| | | | |
|---|---|---|---|
| 10,811,988 B2 * | 10/2020 | Keister ................... | H02M 7/49 |
| 2017/0040905 A1 * | 2/2017 | Zare ........................ | H02M 1/12 |
| 2017/0141694 A1 * | 5/2017 | Keister .............. | H02M 5/4585 |
| 2018/0198377 A1 | 7/2018 | Keister et al. | |

* cited by examiner

POWER SUPPLY SYSTEM FOR A PLURALITY OF ELECTROLYZERS AND ASSOCIATED FACILITY AND METHOD

CROSS-REFERENCE TO RELATED APPLICATIONS

This application claims priority to European Patent Application Serial Number EP23306219.9, filed Jul. 13, 2023, which is herein incorporated by reference.

TECHNICAL FIELD

The present invention concerns electrolyzers, and more particularly a power supply system for a plurality of electrolyzers, a facility comprising such a power supply system, and a method for supplying the plurality of electrolyzers.

BACKGROUND

Generally, an electrolysis plant comprises a plurality of electrolyzers.

Each electrolyzer comprises a water input, a dioxygen output, a dihydrogen output, and a direct current DC power input.

Each electrolyzer supplied by a DC power supply splits water into dihydrogen and dioxygen.

In order to reduce costs and the complexity of the plant, the electrolysis plant generally comprises a common water supply circuit connecting the water inputs of the plurality of electrolyzers for example to a water tank, a common dioxygen exhaust circuit to collect dioxygen generated by the plurality of electrolyzers and a common dihydrogen exhaust circuit to collect dihydrogen generated by the plurality of electrolyzers.

However, due to electric insulation matter and due to the aging of the cells of the electrolyzers, each electrolyzer of the plurality of electrolyzers has to be supplied by a different supply system.

The aging of the cells of an electrolyzer leads to an increase of the supply voltage of the electrolyzer.

As aging of the electrolyzers is not uniform, the supply voltage of each electrolyzer may be different.

Each supply system comprises generally a transformer comprising a primary side connected to a supply grid and a secondary side, and an alternating current AC/direct current DC power converter.

Each AC/DC power converter is made of gate turn off thyristors to increase the efficiency of the AC/DC power converter.

To reduce the harmonic generated by the switching of the gate turn off thyristors rejected on the supply grid, the secondary side of the transformer comprises a plurality of secondary circuits connected to the AC/DC power converter complexifying the design and the manufacturing of the transformer.

Further, each supply system comprises a control circuit to control the AC/DC power converter.

As the number of supply systems is equal to the number of electrolyzers, a plurality of AC/DC power converts and a plurality of control circuits are needed increasing the cost of electrolysis plant and the complexity of the electrolysis plant.

It is therefore proposed to overcome wholly or partially the disadvantages related to systems for supplying a plurality of electrolyzers known from the prior art.

SUMMARY

In view of the foregoing the invention proposes a power supply system for a plurality of electrolyzers.

The power supply system comprises:

main input terminals intended to be connected to a grid, an AC/AC power converter comprising input terminals connected to the main input terminals and output terminals, a control circuit configured to control the AC/AC power converter so that the amplitude of at least one supply current delivered in the output terminals by the AC/AC power converter from power supplied by the grid is equal to a predetermined value, a plurality of supply branches, each supply branch comprising input terminals and at least one set of output terminals intended to be connected to an electrolyzer, the input terminals of the plurality of supply branches being connected in series to the output terminals of the AC/AC power converter to be supplied with the supply current, and each supply branch comprising a branch transformer including a primary circuit connected to the input terminals of the said supply branch and at least one secondary circuit, and at least one rectifier connected to the secondary circuit of the branch transformer, the rectifier comprising output terminals connected to the set of output terminals of the said supply branch to supply the output terminals of the said supply branch with a DC current.

Advantageously, the number of supply branches is equal to the number of electrolyzers, the set of output terminals of each supply branch being intended to be connected to an electrolyzer.

Preferably, the branch transformer of at least one supply branch comprises a same number of secondary circuits as the number of phases of the primary circuit of the said branch transformer, and the at least one supply branch comprises a same number of rectifiers as the number of secondary circuits and comprises a same number of sets of output terminals as the number of rectifiers, each rectifier being connected to a secondary circuit of the branch transformer and comprising output terminals connected to a set of output terminals of the said supply branch to supply the said set of output terminals of the said supply branch with a DC current, the number of phases of the primary circuit of the said branch transformer being at least equal to two.

Advantageously, the power supply system further comprises a main transformer comprising a primary circuit connected to the AC main input terminals and a secondary circuit connected to the input terminals of the AC/AC power converter.

Preferably, the control circuit is further configured to control the AC/AC power converter so that the frequency of the supply current is higher than the frequency of a grid current delivered by the grid on the AC main input terminals.

Advantageously, each rectifier comprises a plurality of phase legs, each phase legs comprising diodes in series.

Preferably, each rectifier comprises a plurality of phase legs, each phase legs comprising transistors and diodes in series.

Advantageously, each rectifier comprises a plurality of phase legs, each phase legs comprising gate turn off thyristors and diodes in series.

Preferably, at least one supply branch comprises a main switch connecting the input terminals of the said supply branch to shunt the said supply branch so that the primary circuit of the branch transformer of the said supply branch is not supplied with the supply current when the main switch is closed.

Preferably, at least one supply branch comprises a main switch connecting phases of at least one secondary circuit of the branch transformer of the said supply branch so that the rectifier of the said supply branch is not supplied with a current when the main switch is closed.

Advantageously, at least one supply branch comprises a first switch connecting the output terminals of at least one rectifier and the set of output terminals of the said supply branch, and a second switch connecting the output terminals of the rectifier, the second switch being located between the rectifier and the first switch.

Another object of the invention relates to a facility comprising a plurality of electrolyzers and a power supply system as defined above, each electrolyzer being connected to a set of output terminals of a supply branch.

Another object of the invention relates to a method for supplying a plurality of electrolyzers.

The method comprises:

controlling an AC/AC power converter comprising input terminals connected to main input terminals coupled to a grid, and output terminals so that the amplitude of at least one supply current delivered in the output terminals by the AC/AC power converter from power supplied by the grid is equal to a predetermined value supplying input terminals of a plurality of supply branches connected in series to the output terminals of the AC/AC power converter with the supply current, each supply branch comprising at least one set of output terminals connected to an electrolyzer, a branch transformer including a primary circuit connected to the input terminals of the said supply branch and at least one secondary circuit, and at least one rectifier connected to the secondary circuit of the branch transformer, the rectifier comprising output terminals connected to the set of output terminals of the said supply branch, the rectifier supplying the set of output terminals of the said supply branch with a DC current to supply the said electrolyzer.

Advantageously, at least one supply branch comprises a main switch connecting the input terminals of the said supply branch, the main switch being open, the method comprising closing the main switch to shunt the said supply branch so that the primary circuit of the branch transformer of the said supply branch is not supplied with the supply current.

Preferably, at least one supply branch comprises a first switch connecting the output terminals of the rectifier and the set of output terminals of the said supply branch, and a second switch connecting the output terminals of the rectifier, the second switch being located between the rectifier and the first switch, the first switch being closed to supply the electrolyzer and the second switch be open, the method comprising:

closing the second switch, and opening the first switch when the second switch is closed.

BRIEF DESCRIPTION OF THE DRAWINGS

Other characteristics and advantages of the invention will emerge on reading the following description of embodiments of the invention, provided solely by way of non-limiting examples and with reference to the drawings in which.

DETAILED DESCRIPTION

Figure 1:
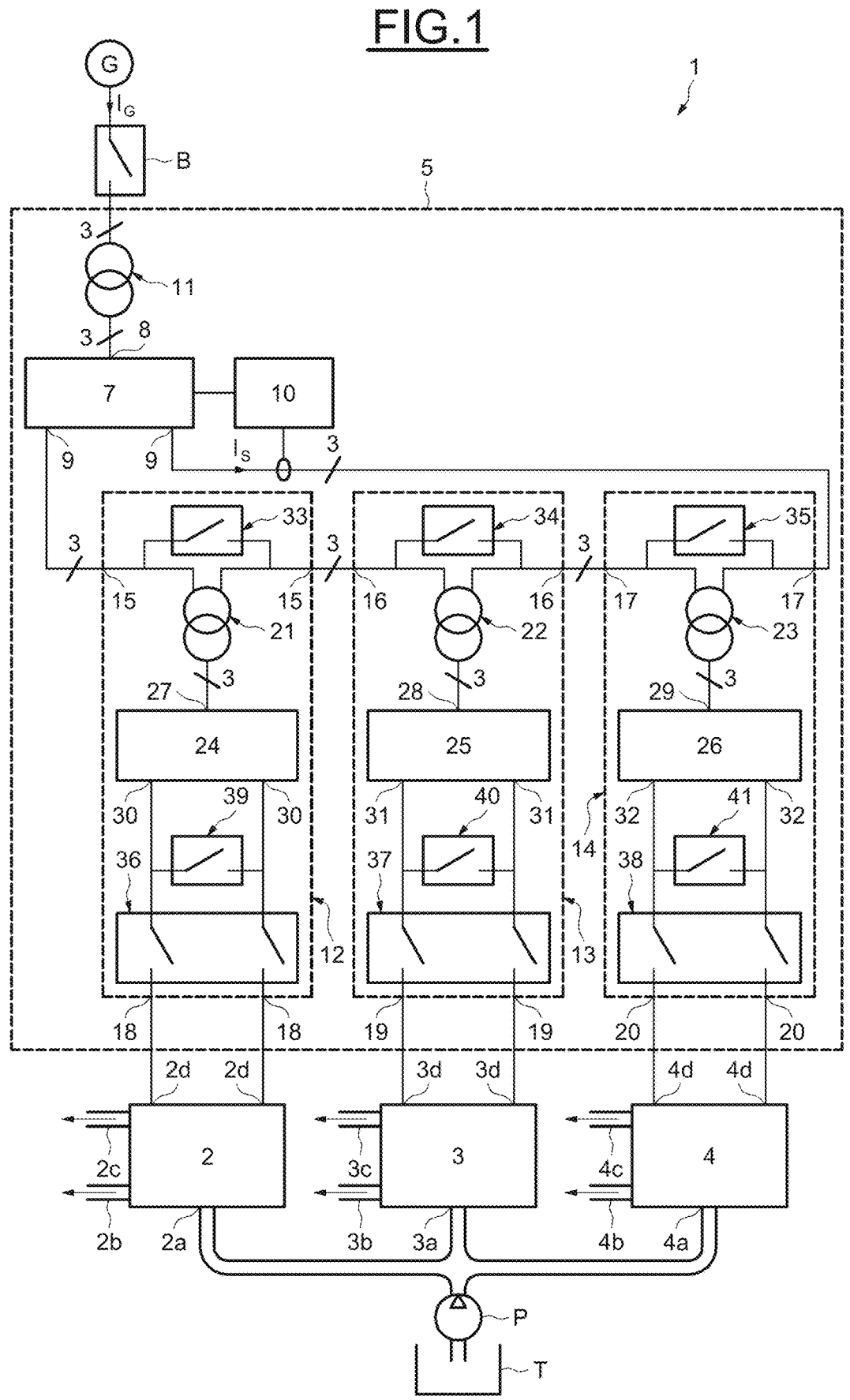
FIG. 1 illustrates schematically an example of a facility according to the invention.

FIG. 1 illustrates an example of a facility 1 comprising a plurality of electrolyzers 2, 3, 4 and a power supply system 5.

The facility 1 comprises N electrolyzers, N being a none nil integer.

For clarity reason, it is assumed that N is equal to three, the facility 1 comprising three electrolyzers 2, 3, 4.

The power supply system 5 comprises main input terminals 6 connected to a grid G through a breaker B.

The grid G may be a three-phase grid delivering a three-phase current IG.

In variant, the grid may be a M phase grid delivering a M-phase current IG, M being a none nil integer.

The grid G may be supplied for example by a solar farm comprising at least one solar panel and/or a wind farm comprising at least one wind turbine.

Each electrolyzer 2, 3, 4 comprises a first input 2a, 3a, 4a connected for example to a pump P supplying water from a tank T.

The water may be water mixed with potassium hydroxide or sodium hydroxide.

Each electrolyzer 2, 3, 4 further comprises a first output 2b, 3b, 4b and a second output 2c, 3c, 4c.

Each electrolyzer 2, 3, 4 comprises terminals 2d, 3d, 4d connected to the power supply system 5.

When the electrolyzer 2, 3, 4 is supplied with water by the pump P and is supplied with a direct DC current delivered by the power supply system 5, the electrolyzer 2, 3, 4 splits water into dihydrogen and dioxygen.

Dioxygen generated by the electrolyzer 2, 3, 4 may exhaust the electrolyzer 2, 3, 4 through the first output 2b, 3b, 4b and dihydrogen generated by the electrolyzer 2, 3, 4 may exhaust the electrolyzer 2, 3, 4 through the second output 2c, 3c, 4c.

The power supply system 5 comprises an alternating current AC/alternating current AC power converter 7 comprising input terminals 8 and output terminals 9, and a control circuit 10.

The output terminals 9 of the AC/AC power converter 7 are X-phase output terminals, X being a none nil integer so that the output terminals 9 deliver a X-phase supply current Is.

It is assumed that X is equal to three so that the AC/AC power converter 7 delivers a three-phase supply current Is on its output terminals 9.

In another variant, X is equal to one so the output terminals 9 deliver a single-phase supply current.

The power supply system 5 further comprises a main transformer 11 comprising a primary circuit connected to the AC main input terminals 6 and a secondary circuit connected to the input terminals 8 of the AC/AC power converter 7.

The main transformer 11 permits to adapt the voltage supplied by the grid G to the power converter 7 for example to optimize the design of the power converter 7, for example to reduce the cost of the power converter 7, and to filter perturbations on the grid G, for example overvoltage.

In another embodiment, the power supply system 5 does not comprise the main transformer 11, the input terminals 8 of the AC/AC power converter 7 being directly connected to the AC main input terminals 6.

The power supply system 5 further comprises N supply branches 12, 13, 14 so that the number of supply branches is equal to the number of electrolyzers 2, 3, 4.

Each supply branch 12, 13, 14 comprises input terminals 15, 16, 17 and a set of output terminals 18, 19, 20.

The input terminals 15, 16, 17 of the supply branches 12, 13, 14 are connected in series to the output terminals 9 of the AC/AC power converter 7.

The set of output terminals 18 of a first supply branch 12 are connected to the terminals 2d of a first electrolyzer 2, the set of output terminals 19 of a second supply branch 13 are connected to the terminals 3d of a second electrolyzer 3 and the set of output terminals 20 of the third supply branch 14 are connected to the terminals 4d of the third electrolyzer 4.

Each supply branch 12, 13, 14 comprises a branch transformer 21, 22, 23 including a primary circuit comprising X-phase and connected to the input terminals 15, 16, 17 of the said supply branch 12, 13, 14, and a secondary circuit comprising X-phase.

The branch transformers 21, 22, 23 may have a same transformation ratio or at least one branch transformer may have a different transformation ratio than the transformation ratio of the other branch transformers.

Each supply branch 12, 13, 14 further comprises a rectifier 24, 25, 26 comprising input terminals 27, 28, 29 including X-phase and connected to the secondary circuit of the branch transformer 21, 22, 23 of the said supply branch and output terminals 30, 31, 32 intended to deliver a DC current.

Each supply branch 12, 13, 14 further comprises a main switch 33, 34, 35 connecting the input terminals 15, 16, 17 of the said supply branch.

In variant, the main switch 33, 34, 35 of the supply branch 12, 13, 14 connects the X-phase of the secondary circuit of the branch transformer 21, 22, 23 of the said supply branch 12, 13, 14.

In another variant, at least one supply branch 12, 13, 14 comprises the main switch 33, 34, 35.

In another variant, the supply branches 12, 13, 14 do not comprise the main switch.

Each supply branch 12, 13, 14 further comprise a first switch 36, 37, 38 connecting the output terminals 30, 31, 32 of the rectifier 24, 25, 26 and the set of output terminals 18, 19, 20 of the said supply branch, and a second switch 39, 40, 41 connecting the output terminals 30, 31, 32 of the rectifier 24, 25, 26 of the said supply branch, the second switch 39, 40, 41 being located between the rectifier 24, 25, 26 of the said supply branch and the first switch 36, 37, 38 of the said branch.

In variant, at least one supply branch 12, 13, 14 comprises the first and second switches 36, 37, 38, 39, 40, 41 or the supply branches 12, 13, 14 does not comprise the first and second switches 36, 37, 38, 39, 40, 41.

When a supply branch 12, 13, 14 does not comprise the first and second switches 36, 37, 38, 39, 40, 41, the output terminals 30, 31, 32 of the rectifier 24, 25, 26 of the said supply branch is directly connected to the set of output terminals 18, 19, 20 of the said supply branch.

Figure 2:
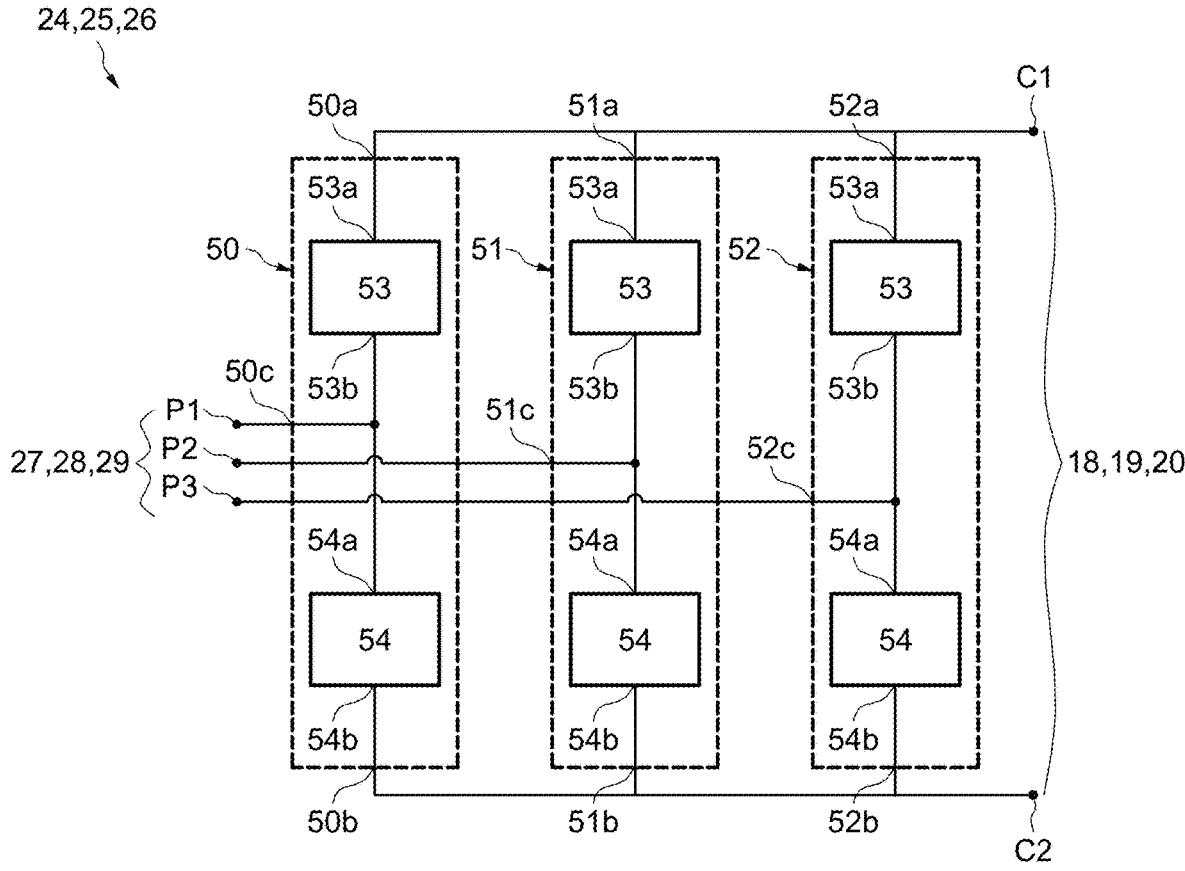
FIG. 2 illustrates schematically an example of a rectifier according to the invention.

FIG. 2 illustrates schematically an example of the rectifier 24, 25, 26.

The rectifier 24, 25, 26 comprises X phase legs 50, 51, 52.

As X is assumed to be equal to three, the rectifier 24, 25, 26 comprises three phase legs 50, 51, 52.

Each phase leg 50, 51, 52 comprises a first terminal 50a, 51a, 52a, a second terminal 50b, 51b, 51b and a third terminal 50c, 51c, 52c.

The first terminal 50a, 51a, 52a of each phase leg 50, 51, 52 is connected to a first connection C1 of the output terminals 18, 19, 20 and the second terminal 50b, 51b, 52b of each phase leg 50, 51, 52 is connected to a second connection C2 of the output terminals 18, 19, 20.

The third terminal 50c of a first phase leg 50 is connected to a first phase P1 of the input terminals 27, 28, 29.

The third terminal 51c of a second phase leg 51 is connected to a second phase P2 of the input terminals 27, 28, 29.

The third terminal 52c of the third phase leg 52 is connected to the third phase P3 of the input terminals 27, 28, 29.

Each phase leg 50, 51, 52 comprises a first switch 53 and a second switch 54.

The first switch 53 comprises a first terminal 53a connected to the first terminal 50a, 51a, 52a of the phase leg 50, 51, 52 and a second terminal 53b connected to the third terminal 50c, 51c, 52c of the phase leg 50, 51, 52.

The second switch 54 comprises a first terminal 54a connected the third terminal 50c, 51c, 52c of the phase leg 50, 51, 52 and a second terminal 54b connected to the second terminal 50b, 51b, 52b of the phase leg 50, 51, 52.

Figure 3:
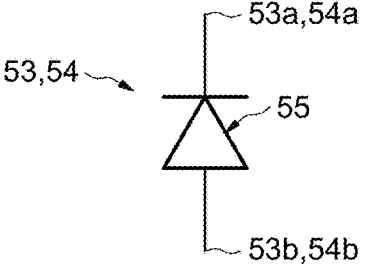
FIG. 3 illustrates schematically a first example of switches according to the invention.

FIG. 3 illustrates schematically a first embodiment of the first and second switches 53, 54.

Each switch of the first and second switches 53, 54 comprises a diode 55 extending between the first and the second terminals 53a, 54a, 53b, 54b so that the cathode of the diode 55 is connected to the first terminal 53a, 54a of the switch and the anode of the diode 55 is connected to the second terminal 53b, 54b of the switch.

As the diode 55 does need to be controlled by a control circuit, the first example of the first and second switches 53, 54 comprising the diode 55 simplify the implementation of the rectifier 24, 25, 26.

Each switch 53, 54 may comprise a plurality of diodes 55 in series so that the anode of one diode is connected to the cathode of another diode.

Figure 4:
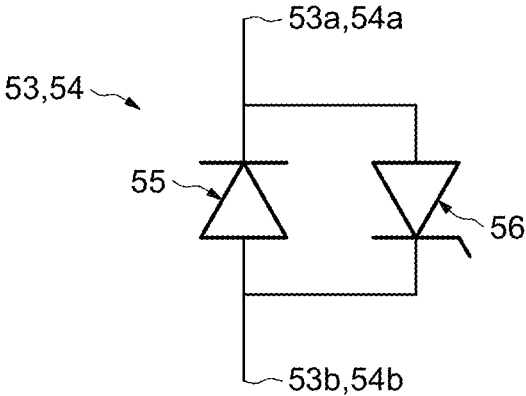
FIG. 4 illustrates schematically a second example of the switches according to the invention.

FIG. 4 illustrates schematically a second embodiment of the first and second switches 53, 54.

Each switch of the first and second switches 53, 54 comprises the diode 55 extending between the first and the second terminals 53a, 54a, 53b, 54b so that the cathode of the diode 55 is connected to the first terminal 53a, 54a of the switch and the anode of the diode 55 is connected to the second terminal 53b, 54b of the switch.

Each switch further comprises a gate turn off thyristor 56.

The gate of the gate turn off thyristor 56 is connected for example to the control circuit 10 or to another control circuit.

The anode of the gate turn off thyristor 56 is connected to the cathode of the diode 55 and the cathode of the gate turn off thyristor 56 is connected to the anode of the diode 55.

Each switch 53, 54 may comprise a plurality of gate turn off thyristors 56 in series so that the anode of one thyristor is connected to the cathode of another thyristor.

Figure 5:
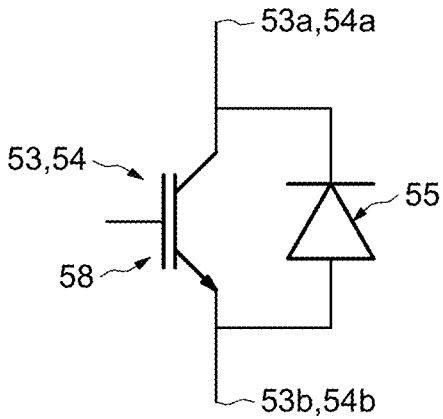
FIG. 5 illustrates schematically a third example of switches according to the invention.

FIG. 5 illustrates schematically a third embodiment of the first and second switches 53, 54.

Each switch of the first and second switches 53, 54 comprises the diode 55 extending between the first and the second terminals 53a, 54a, 53b, 54b so that the cathode of the diode 55 is connected to the first terminal 53a, 54a of the switch and the anode of the diode 55 is connected to the second terminal 53b, 54b of the switch.

Each switch further comprises a field effect transistor 58.

The field effect transistor 58 may be an insulated gate bipolar transistor for example using silicon-base semiconductors such as insulated gate bipolar transistor IGBT or injection-enhanced gate transistor IEGT, or using silicon carbide semiconductors such as metal-oxide-semiconductor field-effect transistor MOSFET.

The gate of the transistor 58 is connected to the control circuit or to another control circuit.

The drain of the transistor 58 is connected to the cathode of the diode 55 and the source of the transistor 58 is connected to the anode of the diode 55.

Each switch 53, 54 may comprise a plurality of transistors 58 and diodes 55 in parallel in series so that the drain of one transistor is connected to the source of another transistor.

In the following, examples of implementations of the power supply 5 are disclosed.

It is assumed that the breaker B is closed so that the grid G supplies the main input terminals 6 and the main switches 33, 34, 35 are open. The primary circuit of the branch transformers 21, 22, 23 are supplied by the AC/AC power converter 7.

It is further assumed that the first switches 36, 37, 38 are closed and the second switches 39, 40, 41 are opened.

The control circuit 10 control the AC/AC power converter 7 so that the output terminals 9 of the AC/AC power converter 7 deliver a three-phase supply current Is from the power supplied by the grid G, the amplitude of the three-phase supply current Is being equal to a predetermine value.

The AC/AC power converter 7 supplies the input terminals 14, 15, 16 of the supply branches 12, 13, 14 connected in series to the output terminals 9 of the AC/AC power converter with the supply current Is.

For each supply branch 12, 13, 14, the secondary circuit of the branch transformer 21, 22, 23 supplies the input terminals 27, 28, 29 of the rectifier 24, 25, 26 of the said supply branch with an AC current from the supply current Is.

The rectifier 24, 25, 26 of the said supply branch delivers on its output terminals 30, 31, 32 a DC current supplying the electrolyzer 2, 3, 4 connected on the set of output terminals 18, 19, 20 of the said supply branch.

The branch transformers 21, 22, 23 provides a galvanic isolation between the rectifiers 25, 25, 26 and the AC/AC power converter 7 so that the supply system 5 implements only one AC/AC power converter 7 to supply the plurality of electrolyzers 2, 3, 4 contrary to an electrolysis plant known form the prior wherein each electrolyzer is supplied by a dedicated power converter.

The control circuit 10 may further control the AC/AC power converter 7 so that the frequency of the supply current Is is higher than the frequency of the grid current IG delivered by the grid G allowing to reduce the size of the branch transformers 21, 22, 23.

For example, the frequency of the grid current IG is equal to 50 Hz and the control circuit 10 controls the AC/AC power converter 7 so that the frequency of the supply current Is is equal to 100 Hz. As the frequency of the supply current Is is twice as the frequency of the grid current IG, the volume of the branch transformers is for example divided by about two reducing the cost and the size of the branch transformers.

The control circuit 10 may close the main switch 33, 34, 35 of the supply branch 12, 13, 14 to shunt the said supply branch so that the primary circuit of the branch transformer 21, 22, 23 of the said supply branch is not supplied with the supply current or so that the rectifier 24, 25, 26 of the said supply branch is not supplied with a current.

The supply branch 12, 13, 14 is shunted for example when a fault is detected in the said branch, for example a fault of the branch transformer or the rectifier or the electrolyzer or an insulation fault of the supply branch, or when maintenance operations are carried out, allowing the supply current Is to supply the other supply branches so that the electrolyzers of the other supply branches are still supplied with power and avoiding to propagate the fault.

The rectifier 24, 25, 26 of the said supply branch is not supplied with a current for example when a fault of the rectifier or the electrolyzer or an insulation fault of the supply branch is detected, or when maintenance operations are carried out, allowing the supply current Is to supply the other supply branches so that the electrolyzers of the other supply branches are still supplied with power and avoiding to propagate the fault.

When an eletrolyzer 2, 3, 4 needs for example to be changed or maintenance operations need to be carried on the said electrolyzer, the control circuit 10 closes the second switch 39, 40, 41 and when the second switch 39, 40, 41 is closed, open the first switch 36, 37, 38 to isolate the said electrolyzer form the power supply system 5 so that the other electrolyzers are still supplied with power by the power supply system 5.

Figure 6:
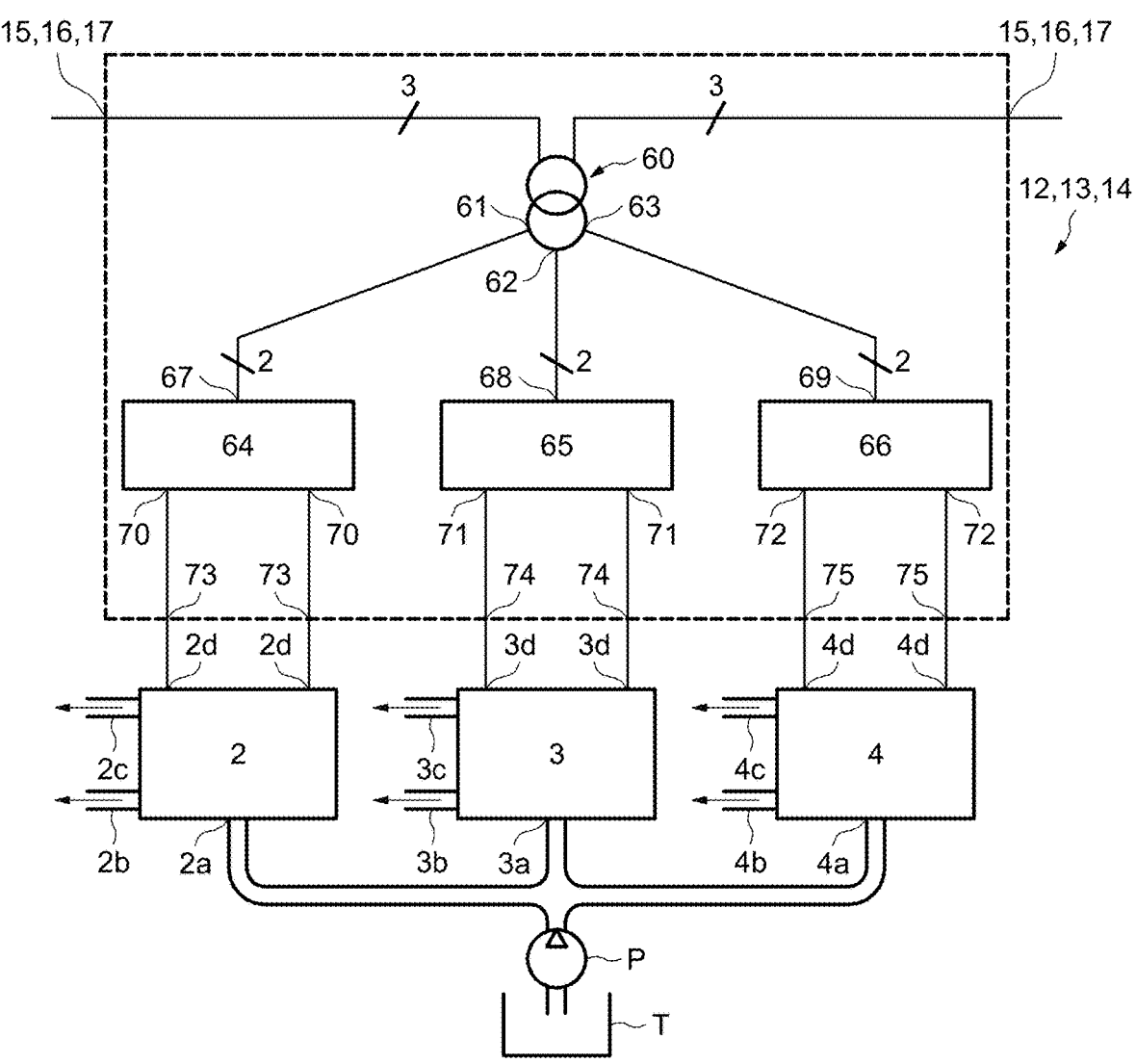
FIG. 6 illustrates schematically another third example of a supply branch according to the invention.

FIG. 6 illustrates schematically another example of the supply branch 12, 13, 14 when the number of phases X is at least equal to two.

The supply branch 12, 13, 14 comprises a branch transformer 60 including a primary circuit comprising X phases and connected to the input terminals 15, 16, 17 of the supply branch 12, 13, 14, and a same number of secondary circuits as the number X of phases of the primary circuit, each secondary circuit being connected to both ends of a winding of the secondary circuit.

The supply branch 12, 13, 14 further comprises a same number of rectifiers as the number of secondary circuits and comprises a same number of sets of output terminals as the number of rectifiers.

As the number of phases of the primary circuit is equal to three, the branch transformer 60 comprises a first secondary circuit 61, a secondary circuit 62 and a third secondary circuit 63.

As the branch transformer 60 comprises three secondary circuits 61, 62, 63, the supply branch 12, 13, 14 comprises three rectifiers 64, 65, 66 comprising input terminals 67, 68, 69 and output terminals 70, 71, 72.

Each terminal of the input terminals 67, 68, 69 and output terminals 70, 71, 72 of the rectifiers 64, 65, 66 comprises two phases.

As the branch transformer 60 comprises three rectifiers 64, 65, 66, the supply branch 12, 13, 14 comprises three sets of output terminals 73, 74, 75.

The input terminals 67 of a first rectifier 64 are connected to the first secondary circuit 61 and the output terminals 70 of the first rectifier 64 are connected to a first sets of output terminals 73.

The input terminals 68 of a second rectifier 65 are connected to the second secondary circuit 62 and the output terminals 71 of the second rectifier 65 is connected to a second sets of output terminals 74.

The input terminals 69 of a third rectifier 66 are connected to the third secondary circuit 63 and the output terminals 72 of the third rectifier 66 is connected to a third sets of output terminals 75.

The first sets of output terminals 73 are connected to the terminals 2*d* of the first electrolyzer 2, the second sets of output terminals 74 are connected to the terminals 3*d* of the second electrolyzer 3 and the third sets of output terminals 75 are connected to the terminals 4*d* of the third electrolyzer 4.

Each rectifier 64, 65, 66 supplies the electrolyzer 2, 3, 4 connected to the output terminals of the said rectifier from the supply current Is. The supply branch 12, 13, 14 may supply more than one electrolyzer, the supply branch 12, 13, 14 may supply X electrolyzers, for example three electrolyzers 2, 3, 4 as represented on FIG. 6 when X is equal to three. The supply branch 12, 13, 14 may comprise the main switch 33, 34, 35 as described above.

The supply branch 12, 13, 14 may further comprise the first and second switches 36, 37, 38, 39, 40, 41 as described above.

Figure 7:
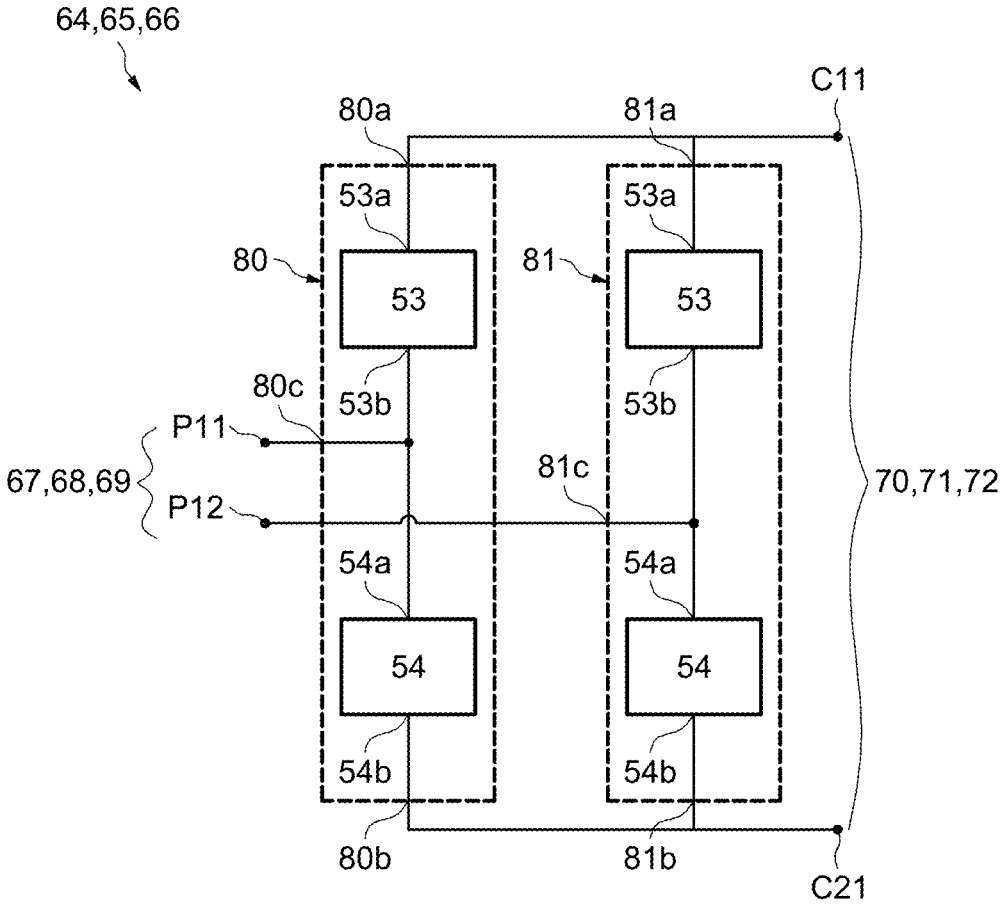
FIG. 7 illustrates another example of the rectifier according to the invention.

FIG. 7 illustrates an example of the rectifiers 64, 65, 66. The rectifier 64, 65, 66 comprises two phase legs 80, 81.

Each phase leg 80, 81 comprises a first terminal 80*a*, 81*a*, a second terminal 80*b*, 81*b* and a third terminal 80*c*, 81*c*.

The first terminal 80*a*, 81*a* of each phase leg 80, 81 is connected to a first connection C11 of the output terminals 70, 71, 72 and the second terminal 80*b*, 81*b* of each phase leg 80, 81 is connected to a second connection C21 of the output terminals 70, 71, 72.

The third terminal 80*c* of a first phase leg 80 is connected to a first phase P11 of the input terminals 67, 68, 69.

The third terminal 81*c* of the second phase leg 81 is connected to the second phase P12 of the input terminals 67, 68, 69.

Each phase leg 80, 81 comprises the first switch 53 and the second switch 54.

The first terminal 53*a* of the first switch 53 is connected to the first terminal 80*a*, 81*a* of the phase leg 80, 81 and the second terminal 53*b* of the first switch 53 is connected to the third terminal 80*c*, 81*c* of the phase leg 80, 81.

The first terminal 55*a* of the second switch 54 is connected to the third terminal 80*c*, 81*c* of the phase leg 80, 81 and the second terminal 54*b* of the second switch 54 is connected to the second terminal 80*b*, 81*b* of the phase leg 80, 81.

The invention claimed is:

1. A power supply system for a plurality of electrolyzers, characterized in that the power supply system comprises:
   - main input terminals to be connected to a grid,
   - an AC/AC power converter comprising input terminals connected to the main input terminals and output terminals,
   - a control circuit configured to control the AC/AC power converter so that an amplitude of at least one supply current delivered in the output terminals by the AC/AC power converter from power supplied by the grid is equal to a predetermined value,
   - a plurality of supply branches, each supply branch comprising input terminals and at least one set of output terminals intended to be connected to an electrolyzer, the input terminals of the plurality of supply branches being connected in series to the output terminals of the AC/AC power converter to be supplied with the supply current, and each supply branch comprising a branch transformer including a primary circuit connected to the input terminals of the said supply branch and at least one secondary circuit, and at least one rectifier connected to the secondary circuit of the branch transformer, the rectifier comprising output terminals connected to the set of output terminals of the said supply branch to supply the output terminals of the said supply branch with a DC current.

2. The power supply system according to claim 1, wherein the number of supply branches is equal to the number of electrolyzers, the set of output terminals of each supply branch being intended to be connected to an electrolyzer.

3. The power supply system according to claim 1, wherein the branch transformer of at least one supply branch comprises a same number of secondary circuits as the number of phases of the primary circuit of the said branch transformer, and the at least one supply branch comprises a same number of rectifiers as the number of secondary circuits and comprises a same number of sets of output terminals as the number of rectifiers, each rectifier being connected to a secondary circuit of the branch transformer and comprising output terminals connected to a set of output terminals of the said supply branch to supply the said set of output terminals of the said supply branch with a DC current, the number of phases of the output terminals of the AC/AC power converter being at least equal to two.

4. The power supply system according to claim 1, further comprising a main transformer comprising a primary circuit connected to the AC main input terminals and a secondary circuit connected to the input terminals of the AC/AC power converter.

5. The power supply system according to claim 1, wherein the control circuit is further configured to control the AC/AC power converter so that the frequency of the supply current is higher than the frequency of a grid current delivered by the grid on the AC main input terminals.

6. The power supply system according to claim 1, wherein each rectifier comprises a plurality of phase legs, each phase legs comprising diodes in series.

7. The power supply system according to claim 5, wherein each rectifier comprises a plurality of phase legs, each phase legs comprising transistors and diodes in series.

8. The power supply system according to claim 1, wherein each rectifier comprises a plurality of phase legs, each phase legs comprising gate turn off thyristors and diodes in series.

9. The power supply system according to claim 1, wherein at least one supply branch comprises a main switch connecting the input terminals of the said supply branch to shunt the said supply branch so that the primary circuit of the branch transformer of the said supply branch is not supplied with the supply current when the main switch is closed.

10. The power supply system according to claim 1, wherein at least one supply branch comprises a main switch connecting phases of at least one secondary circuit of the branch transformer of the said supply branch so that the rectifier of the said supply branch is not supplied with a current when the main switch is closed.

11. The power supply system according to claim 1, wherein at least one supply branch comprises a first switch connecting the output terminals of at least one rectifier and the set of output terminals of the said supply branch, and a second switch connecting the output terminals of the rectifier, the second switch being located between the rectifier and the first switch.

12. A facility comprising a plurality of electrolyzers and a power supply system according to claim 1, each electrolyzer being connected to a set of output terminals of a supply branch.

13. A method for supplying a plurality of electrolyzers, the method comprises:

controlling an AC/AC power converter comprising input terminals connected to main input terminals coupled to a grid, and output terminals so that the amplitude of at least one supply current delivered in the output terminals by the AC/AC power converter from power supplied by the grid is equal to a predetermined value supplying input terminals of a plurality of supply branches connected in series to the output terminals of the AC/AC power converter with the supply current, each supply branch comprising at least one set of output terminals connected to an electrolyzer, a branch transformer including a primary circuit connected to the input terminals of the said supply branch and at least one secondary circuit, and at least one rectifier connected to the secondary circuit of the branch transformer, the rectifier comprising output terminals connected to the set of output terminals of the said supply branch, the rectifier supplying the set of output terminals of the said supply branch with a DC current to supply the said electrolyzer.

14. The method according to claim 13, wherein at least one supply branch comprises a main switch connecting the input terminals of the said supply branch, the main switch being open, the method comprising closing the main switch to shunt the said supply branch so that the primary circuit of the branch transformer of the said supply branch is not supplied with the supply current.

15. The method according to claim 13, wherein at least one supply branch comprises a first switch connecting the output terminals of the rectifier and the set of output terminals of the said supply branch, and a second switch connecting the output terminals of the rectifier, the second switch being located between the rectifier and the first switch, the first switch being closed to supply the electrolyzer and the second switch be open, the method comprising:

closing the second switch, and opening the first switch when the second switch is closed.

\* \* \* \* \*